May 25, 1937. R. M. RITTER 2,081,768
VAPORIZER
Filed May 11, 1934
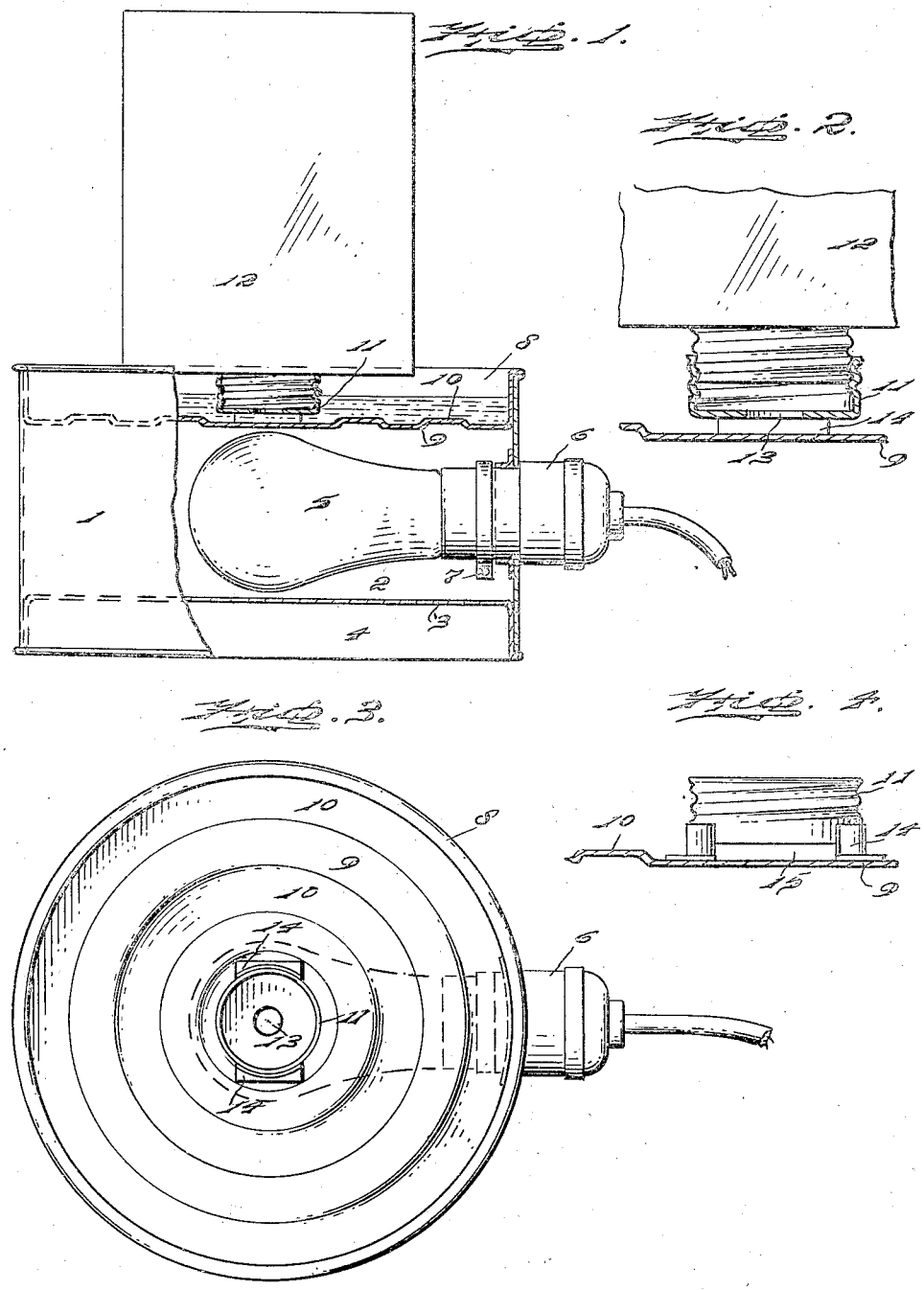
INVENTOR
Richard M. Ritter
BY
Herbert S. Fairbanks
ATTORNEY Patented May 25, 1937

2,081,768

UNITED STATES PATENT OFFICE 2,081,768

VAPORIZER

Richard M. Ritter, Philadelphia, Pa.

Application May 11, 1934, Serial No. 725,120

1 Claim. (Cl. 21—120)

The object of this invention is to devise a novel vaporizer which can be used as an evaporator, fumigator, gasifier, disinfector, deodorizer, perfumer, or for similar purposes and which employs a generated heat to vaporize or evaporate emulsions, volatile solid compounds, or volatile chemical liquids.

A further object of the invention is to devise a novel vaporizer, having a heating chamber with a source of heat and a closure plate or lid which supports the container for the material to be vaporized or evaporated.

The feed of material from the container to the vaporizing plate is controlled by relative movement between the container and the means for attaching it to the plate.

With the above and other objects in view as will hereinafter clearly appear, my invention comprehends a novel vaporizer.

It further comprehends a novel heating chamber having a removable closure and novel means for connecting a container with said closure so that the feed from the container may be regulated.

Other novel features of construction and advantage will hereinafter more clearly appear in the detailed description and the appended claim.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a side elevation partly in section of a vaporizer embodying my invention.

Figure 2 is a sectional view on an enlarged scale showing more particularly the manner in which the feed from the container is controlled.

Figure 3 is a top plan view of the vaporizer.

Figure 4 is a side elevation of the means for connecting the container and closure, the closure being shown in section.

Similar numerals indicate corresponding parts.

Referring to the drawing:

1 designates a casing or body portion having a heating chamber 2. The bottom of the casing is deflected upwardly as at 3 to form a heat insulating space 4. 5 designates a source of heat such as for example an electric bulb which is carried by a socket 6 inserted through the side wall of the casing and retained in position by a clamp 7 so that the socket can be readily renewed, if necessary. 8 designates a closure for the casing 1. This closure has a frictional fit within the casing to engage the inner wall of the casing near the top and is provided with a depressed portion 9 forming an evaporating plate, preferably corrugated as at 10 to increase the amount of vaporizing surface. The closure is in the form of a shallow pan closing the upper end of the heating chamber 2. 11 designates a connector and feed controlling member, the construction and arrangement of which may vary widely in practice. As I have shown a conventional container 12 having a threaded discharge outlet, the connector has been shown as a threaded cap having a discharge opening 13 spaced from the depressed plate portion of the closure 8. The connector has preferably a flat bottom spaced from the plate 9 by its securing means 14 of any desired construction such as for example by soldering or welding so that discharge openings 15 are formed which regulate the ratio of the flow of the product to be evaporated.

In the operation, the cap is removed from the conventional container in which the material is shipped, and the closure 8 is removed and the container tightly secured to the closure. The closure is then placed on the casing to form a tight fit therewith and with the bottom of the container pointing upwardly. The heat is turned on. Liquids will flow to the evaporating plate and up to the level of the cap outlet, while volatile solids will liquefy by heat and also flow up to the connector cap outlet. As soon as the heat generated in the heating chamber has evaporated a sufficient quantity of liquid so that the level of the liquid on the evaporating plate is below the connector cap outlet, another volume of liquid is released from the container until the cap outlet is again closed, thus providing automatic feeding until the product in the container is spent.

If it is desired to feed a larger volume of liquid, the container is unscrewed to increase its spacing from the bottom of the connector.

It will thus be apparent that there is a slow automatic feed of volatile solids or liquids to the heated vaporizing plate so that fine films of the product in the container are continuously evaporated, and also if desired heavier layers depending upon the adjustment of the container on the connector.

The heating unit which is interchangeable, supplies heat indirectly, and, as no direct heat is used, there are no fire hazards.

My present invention is suitable for many purposes such as for example, vaporizing of medicines, disinfecting, deodorizing, fumigating, perfuming and other uses falling within its scope.

If a closet in the home is to be fumigated to destroy destructive insects such as moth larvae, carpet beetles and the like in clothing, carpets or other material, the proper fumigating product is selected and its container connected with the closure. The vaporizer is then placed in the closet, the electric socket connected with a light socket. The closet is closed tight for about twenty-four hours with the heat on. The automatically released fumes confined to the closet will kill by penetration all destructive vermin, with no fire hazards involved.

The heating chamber in the closet has a tendency to create a warm atmosphere under which vermin is more active and at the same time more susceptible to the released fumes, thus creating ideal conditions for a proper fumigating method.

The automatic feeding means is so constructed that it preheats the product in the container, so that when it flows on to the vaporizing plate it is practically ready for instantaneous evaporation.

My present method has evident advantages over prior methods using direct open heat without automatic feeding with the intention of evaporating large volumes at a time, requiring a large amount of heat, whereas in my invention a film of the product is automatically fed in a preheated condition to an evaporating plate without using a powerful heating unit.

My present invention can be economically manufactured, and can be employed by persons who are unskilled in the art of vaporizing and fumigating.

It will now be apparent that I have devised a new and useful vaporizer which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:

In a vaporizer, an imperforate casing having its bottom deflected upwardly to form an insulating space, an imperforate cover in frictional engagement with the walls of said casing and deflected downwardly to form an evaporating surface, an electric light bulb within said casing, an inverted screw cap having an opening in its bottom, means to secure said bottom to said cover at opposite points to space its discharge opening from the cover, and an inverted container for the product to be vaporized having a screw threaded discharge end to be screwed into said cap.

RICHARD M. RITTER.